US008931051B2

(12) United States Patent
Kumar et al.

(10) Patent No.: US 8,931,051 B2
(45) Date of Patent: Jan. 6, 2015

(54) SCALABLE AND HIGHLY AVAILABLE CLUSTERING FOR LARGE SCALE REAL-TIME APPLICATIONS

(71) Applicant: Microsoft Corporation, Redmond, WA (US)

(72) Inventors: Namendra Kumar, Redmond, WA (US); Krishnan Ananthanarayanan, Bothell, WA (US); Sankaran Narayanan, Redmond, WA (US); Dhigha Sekaran, Redmond, WA (US); Vadim Eydelman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 10 days.

(21) Appl. No.: 13/676,518

(22) Filed: Nov. 14, 2012

(65) Prior Publication Data
US 2014/0137187 A1    May 15, 2014

(51) Int. Cl.
| G06F 21/00 | (2013.01) |
| H04L 29/06 | (2006.01) |
| G06F 15/16 | (2006.01) |
| G06F 17/30 | (2006.01) |
| H04L 12/42 | (2006.01) |
| H04L 12/26 | (2006.01) |

(52) U.S. Cl.
CPC .......... *G06F 15/16* (2013.01); *G06F 17/30584* (2013.01)
USPC .................................... 726/3; 726/8; 709/204

(58) Field of Classification Search
CPC ........................... G06F 17/30486; G06F 15/16
USPC .................................... 726/3; 704/8; 709/204
See application file for complete search history.

(56) References Cited

U.S. PATENT DOCUMENTS

| 6,427,163 | B1 | 7/2002 | Arendt et al. |
| 7,239,606 | B2 | 7/2007 | Gilmour et al. |
| 2003/0154236 | A1 | 8/2003 | Dar et al. |
| 2006/0190243 | A1* | 8/2006 | Barkai et al. ...................... 704/8 |
| 2013/0191453 | A1* | 7/2013 | Nishanov et al. ............. 709/204 |

FOREIGN PATENT DOCUMENTS

EP    2099158 A1 *    9/2009

OTHER PUBLICATIONS

Miller, S.; Bode, B.; "The node monitoring component of a scalable systems software environment"; Parallel and Distributed Systems, 2006. ICPADS 2006. 12th International Conference on vol. 1; DOI: 10.1109/ICPADS.2006.106; Publication Year: Aug. 2006; pp. 1-10.*

(Continued)

*Primary Examiner* — Andrew Nalven
*Assistant Examiner* — Courtney Fields
(74) *Attorney, Agent, or Firm* — Andrew Smith; Jim Ross; Micky Minhas

(57) ABSTRACT

Scaling and highly available clustering for large scale real-time applications is provided. A ring may be formed which includes multiple nodes for providing a set of services in a system. When a network partition is detected which affects communications between each of the nodes in the ring, the formation of additional rings is prevented by shutting down nodes which include a minority of voting nodes in the ring while maintaining the availability of the nodes which include a majority of the voting nodes to continue providing the set of services in the system.

16 Claims, 5 Drawing Sheets

(56) References Cited

OTHER PUBLICATIONS

Sarwar, et al., "Recommender Systems for Large-scale E-Commerce: Scalable Neighborhood Formation Using Clustering", In Proceedings of the 5th International Conference on Computer and Information Technology, Dec. 2002, 6 pages.

Baker, et al., "Megastore: Providing Scalable, Highly Available Storage for Interactive Services", In 5th Biennial Conference on Innovative Data Systems Research, Jan. 9, 2011, 12 pages.

Grauer, Zvi, "Grids and Clusters Part 2: Clusters and their Applications", Retrieved on: Oct. 25, 2012, Available at: http://www.serverbeach.com/resources/Grids%20and%20Clusters%20Part%202%20ClusClus%20and%20their%20Applications.

"Best Practices for Availability", Retrieved on: Oct. 26, 2012, Available at: http://msdn.microsoft.com/en-us/library/aa291556(v=vs.71).aspx.

* cited by examiner

SCALABLE AND HIGHLY AVAILABLE CLUSTERING FOR LARGE SCALE REAL-TIME APPLICATIONS

COPYRIGHT NOTICE

A portion of the disclosure of this patent document may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In many business organizations, large scale server applications are utilized by multiple user groups (e.g., a human resources group, an accounting group, etc.) for interacting among one another and for performing various functions. As changes in the number of users (or groups of users) using server applications in an organization occur, "scaling" may need to be implemented to accommodate the changes. One scaling approach is to add more power (i.e., processors machines and/or memory) to support a given entity (i.e., users or applications). This is known as "scaling up". Another scaling approach is to add more machines (i.e., servers) to support a given entity (i.e., users or applications). This is known as "scaling out." A third approach is a combination of the first two approaches (i.e., "scaling up" and "scaling out"). Current implementations of the aforementioned scaling approaches however, suffer from a number of drawbacks. For example, when scaling out a large number of machines (e.g., adding hundreds of machines to an existing cluster), current implementations based on full mesh heartbeats, will fail to scale out as the number of machines increases. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for the scaling and highly available clustering of large scale real-time applications. A ring may be formed which includes multiple nodes for providing a set of services. A current state associated with each of the nodes in the ring may be maintained. When a failure which affects communications between each of the nodes in the ring is detected, the formation of additional rings is prevented by shutting down nodes which include a minority of voting nodes in the ring while maintaining the availability of the nodes which include a majority of the voting nodes to continue providing the set of services.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for the scaling and highly available clustering of large scale real-time applications. A ring may be formed which includes multiple nodes for providing a set of services. A current state associated with each of the nodes in the ring may be maintained. When a failure which affects communications between each of the nodes in the ring is detected, the formation of additional rings is prevented by shutting down nodes which include a minority of voting nodes in the ring while maintaining the availability of the nodes which include a majority of the voting nodes to continue providing the set of services.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1A:
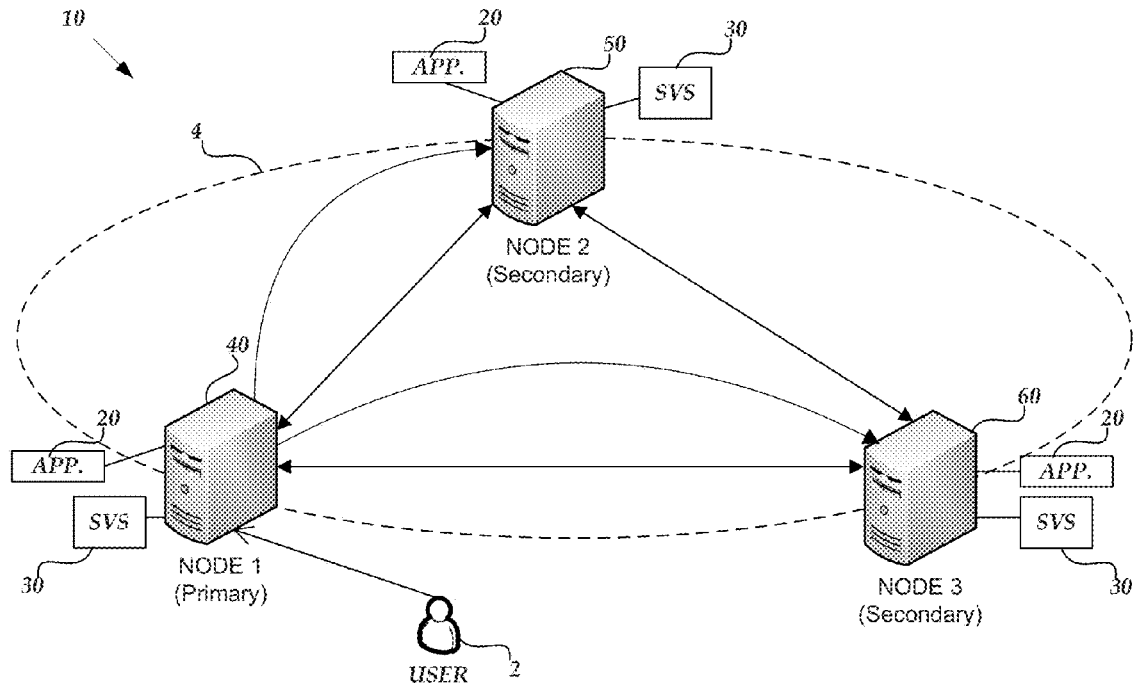
FIG. 1A is a block diagram illustrating a server architecture which may be utilized for providing scalable and highly available clustering for large scale real-time applications, in accordance with an embodiment.

Referring now to the drawings, in which like numerals represent like elements through the several figures, various aspects of the present invention will be described. FIG. 1A is a block diagram illustrating a server architecture 10 which may be utilized for providing scalable and highly available clustering for large scale real-time applications, in accordance with an embodiment. When reading the following detailed description, the terms "machine," "node," "server" and "front end" may be used interchangeably throughout and are synonymous. Similarly, the terms "pool" and "cluster" may be used interchangeably throughout and are synonymous. As defined herein, a "pool" (or cluster) is a set of machines, nodes, servers or Front Ends.

The server architecture 10 includes nodes 40, 50 and 60 which are in communication with each other. The set of the nodes 40, 50 and 60 may collectively define a cluster and that the cluster may form a ring 4, in which each of the nodes is capable of knowing its own state as well as the state of its neighbors. Thus, for example, the node 40 in the ring 4 may know its own state as well as the states of the nodes 50 and 60, the node 50 may know its own state as well as the states of the nodes 40 and 60, and the node 60 may know its own state as well as the states of the nodes 40 and 50. In the ring 4, the node 40 may be designated as a primary node while the nodes 50 and 60 may be designated as secondary nodes. It should be understood that the number of secondary nodes in a system is configurable and may be based on balancing the demands of high availability (i.e., the number of tolerable node failures) versus overall system responsiveness. The primary node (i.e., the node 40) may provide a set of services 30 for a user 2 which are mapped to the ring 4. Copies of the set of services 30 may also be provided by the secondary nodes 50 and 60. As defined herein, a "service" is an abstract concept which identifies a set of data which needs to be made highly available to one or more users. When a user signs-in to access a service, she would sign-in to the node that is the primary for the service to which she is mapped. For example, a user of banking services mapped to the node 40 would sign-in to the node 40 (i.e., the primary node) to retrieve banking account data. As will be discussed in greater detail herein, the services 30 may be uniformly (i.e., evenly) distributed across the nodes 40, 50 and 60 in the ring 4 to ensure that any load on the nodes also uniformly distributed (i.e., load balanced). It should be understood that data on the primary node 40 may be replicated onto the secondary nodes 50 and 60 (shown by the curved arrows between the nodes 40, 50 and 60). The aforementioned replication facilitates providing high availability to the services 30 in response to a node failure. It should further be understood that when data is changed on the primary node 40 (e.g., by a user or application using the services 30), the data changes are replicated to the secondary nodes 50 and 60.

Each of the nodes 40, 50 and 60 may also store an application 20 which may be utilized to provide high availability and load balancing for the ring 4. The aforementioned functionality of the application 20 will be described in greater detail with respect to FIGS. 1B, 1C and 2-3, below. In accordance with an embodiment, the application 20 may comprise the LYNC SERVER enterprise-ready unified communications platform software from MICROSOFT CORPORATION of Redmond, Wash. It should be understood, however, that other communications platform software from other manufacturers may alternatively be utilized in accordance with the various embodiments described herein.

Figure 1B:
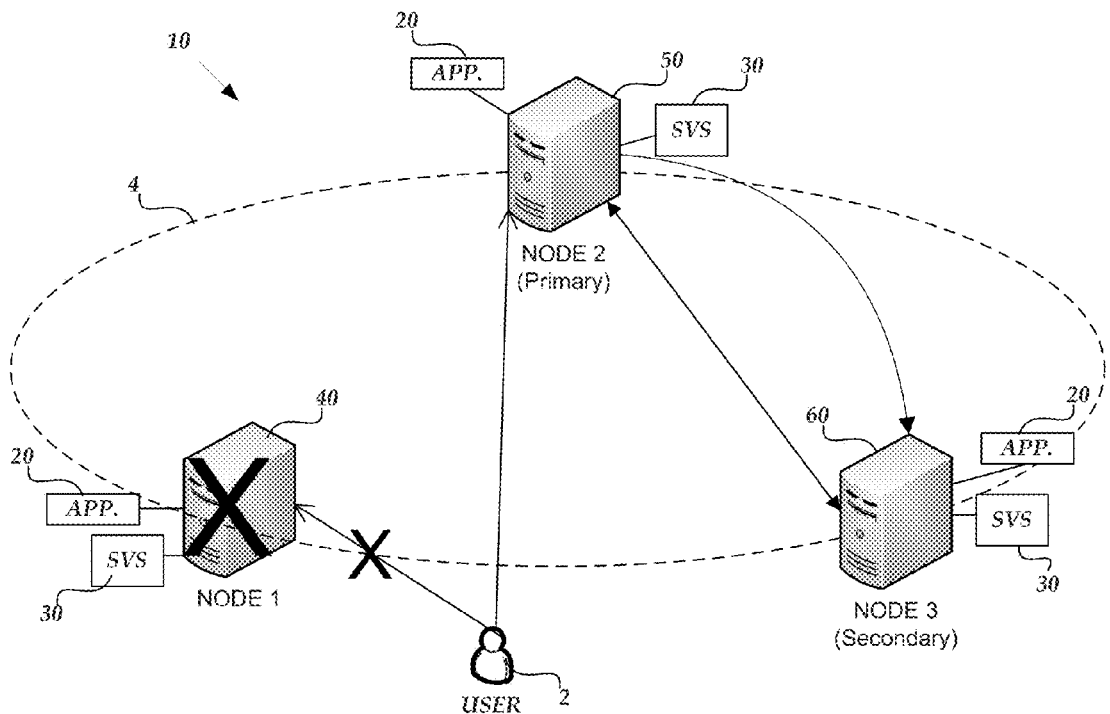
FIG. 1B is a block diagram illustrating a server architecture which may be utilized for providing high availability in response to a node failure, in accordance with an embodiment.

FIG. 1B is a block diagram illustrating a server architecture which may be utilized for providing high availability in response to a node failure, in accordance with various embodiments. In the server architecture 10 of FIG. 1B, a node failure for the primary node 40 is shown. As will be described in greater detail below with respect to FIG. 2, the application 20 may be utilized to select the node 50 (previously designated as a secondary node in FIG. 1A) as the primary node in the ring 4 upon the failure of the node 40.

Figure 1C:
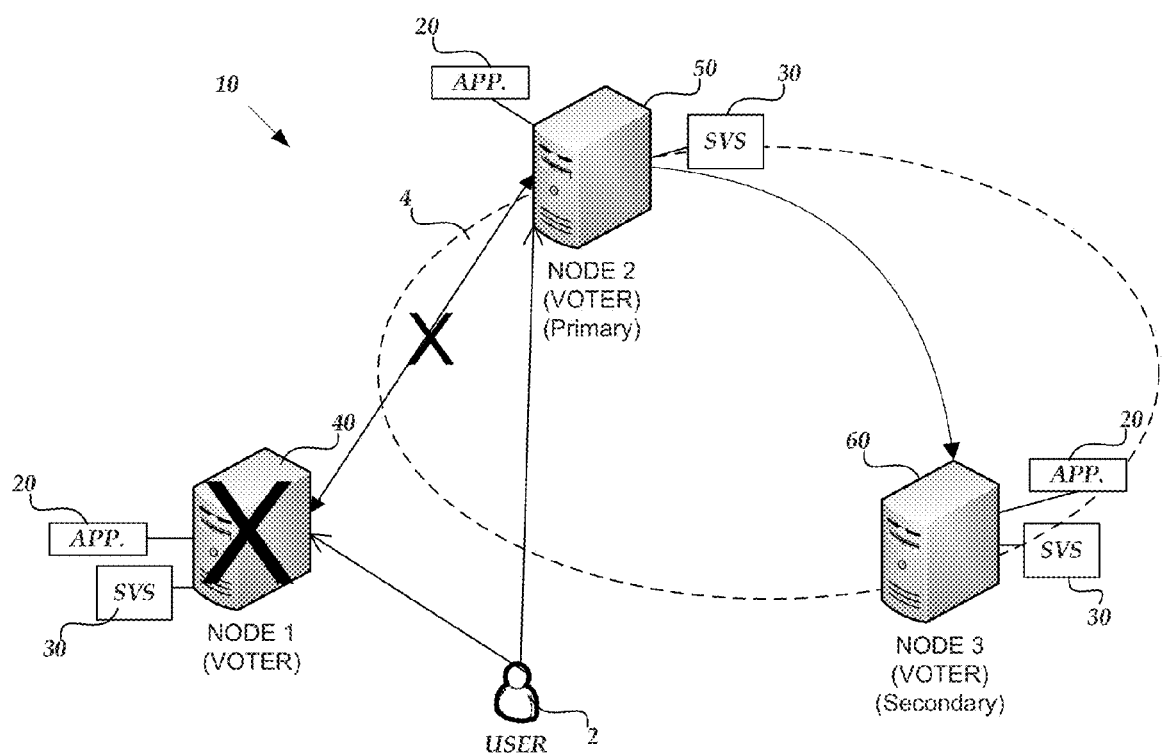
FIG. 1C is a block diagram illustrating a server architecture which may be utilized for providing scalable and highly available clustering for large scale real-time applications in response to a network partition, in accordance with an embodiment.

In the server architecture 10 of FIG. 1C, a network partition is shown as having occurred in the ring 4 between the primary node 40 and the secondary nodes 50 and 60. A network partition is a condition in which a network communications link between nodes is broken. Thus, as a result of the failure of the network communications link between the primary node 40 and the secondary node 60, the secondary nodes 50 and 60 are able to communicate with each other but not with the primary node 40. It should be appreciated that without the utilization of the embodiments disclosed herein, as a result of the network partition, the primary node 40 will attempt to form its own ring which will function in addition to the ring 4 comprising the nodes 50 and 60 (in this example, the node 50 would serve as the primary node for the ring 4). Those skilled in the art should appreciate that such a situation is undesirable because multiple rings can lead to data inconsistencies based on the node a user may sign-in to for accessing services. In particular, since the user 2 would be served by multiple partitions (each having a primary node for the user to sign-in to for accessing services), operations performed by the user on the node 40 would not be performed on the nodes 50 and 60. As an example, the user 2 may be connected to the node 40 to utilize a banking service for conducting a banking transaction (e.g., making a deposit into an account). Subsequently, the user 2 may be connected to the node 50 to utilize the same banking service. However, as a result of network partitioning, the user 2 would not see the banking transaction made on the node 40 since there is no communication between the nodes 40 and 50.

As will be discussed in greater detail herein with respect to FIG. 3, the application 20 may be utilized to prevent the formation of multiple rings being formed by a network partition by designating a set of nodes in the ring to be voter nodes (i.e., because a node from each of these designated set of nodes may be utilized to make multiple ring operation decisions). It should be understood that, in accordance with an embodiment, voter nodes may comprise specially designated LYNC SERVER front ends. As defined herein, a voter node (or "voter") is an agent executing on a specially designated node. The voter nodes may be utilized to prevent the formation of multiple rings by shutting down nodes in a partition comprising a minority of voters. For example, as shown in FIG. 1C, the nodes 40, 50 and 60 are designated as voter nodes. As a result of the network partition created by the failure of the communications link between the node 40 and the nodes 50 and 60, the node 40 represents a minority of the total number of voter nodes with respect to the nodes 50 and 60. Thus, the application 20 will shut down the node 40 thereby preventing the user 2 from signing-in to access the services 30 and further preventing the formation of an additional ring which could lead to data inconsistencies. It should be understood that the total number of voter nodes designated should be an odd number so as to prevent the occurrence of any "tie" votes (i.e., to ensure a majority) as a result of a network partition between nodes.

Figure 2:
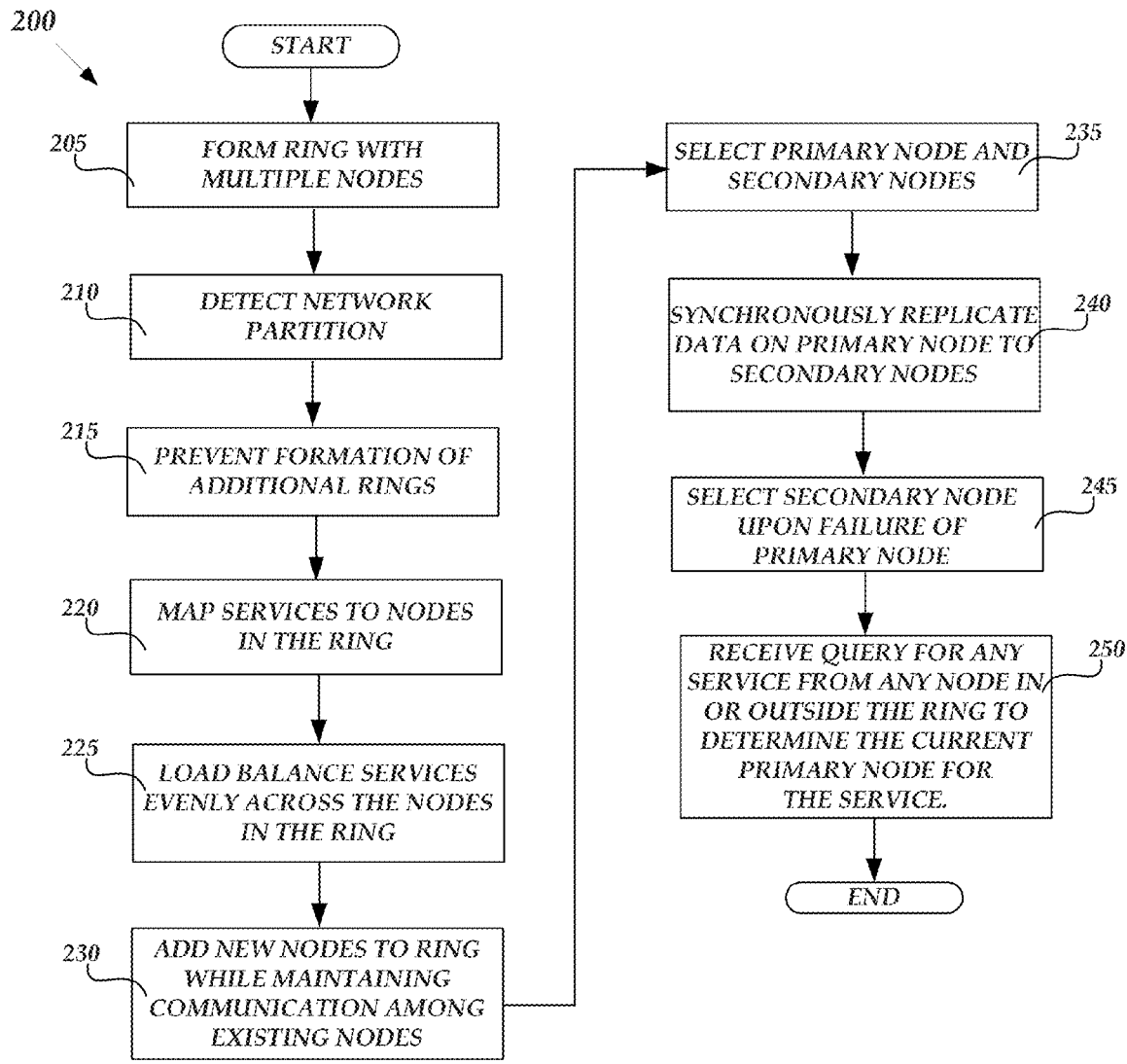
FIG. 2 is a flow diagram illustrating a routine for providing scalable and highly available clustering for large scale real-time applications, in accordance with an embodiment.

FIG. 2 is a flow diagram illustrating a routine 200 providing scalable and highly available clustering for large scale real-time applications, in accordance with an embodiment. When reading the discussion of the routine presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 2-3 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 200 begins at operation 205, where the application 20 executing on one or more of the nodes 30, 40 and 50, is utilized to form a ring. In particular, the application 20 may be utilized to form a ring in which a system of nodes (i.e., a cluster) maintains a state of each of the nodes in the ring.

From operation 205, the routine 200 continues to operation 210, where the application 20 may be utilized to detect a network partition in the ring. In particular (and as discussed above with respect to FIG. 1C), the application 20 may be configured to detect a failure of a communications link between multiple nodes in a ring.

From operation 210, the routine 200 continues to operation 215, where the application 20 may be utilized to prevent the formation of additional rings. In particular, (and as discussed above with respect to FIG. 1C), the application 20 may be configured to designate a set (or subset) of nodes in a ring as voter nodes which may be utilized to shut down nodes which represent a minority. A routine which provides further details for utilizing voter nodes to prevent the formation of additional rings will be described in greater detail below with respect to FIG. 3.

From operation 215, the routine 200 continues to operation 220, where the application 20 may be utilized to map services to each of the nodes in the ring. It should be understood that an entity (i.e., a user or application using the service) may be mapped to a service. The front end (or node) that is the primary for a particular service provides that service. For example, a user would sign-in to the node that is the primary for the service to which the user is mapped.

From operation 220, the routine 200 continues to operation 225, where the application 20 may be utilized to load balance services evenly across the nodes of the ring. In particular, the application 20 may be configured to uniformly distribute services across the nodes in the ring to ensure that the load is uniformly distributed. It should be understood that, in accordance with an embodiment, the application 20 may utilized a load balancing algorithm to ensure that the nodes are evenly load balanced. Thus, the even usage of resources and good performance characteristics are ensured with respect to the end user.

From operation 225, the routine 200 continues to operation 230, where the application 20 may be utilized to add (i.e., scale) new nodes to a ring while maintaining communication among existing nodes. In particular, when a node is added to a ring, the added node may retrieve the data required to service entities (i.e., users or other applications) from multiple sources. The multiple sources may include, but are not limited to other nodes in the ring if the data is available there, and a backup data store if none of the other nodes in the ring have the required data. It should be understood that, in accordance with various embodiments, new nodes may be added to a ring without any resulting downtime with respect to any of the other nodes. It should further be understood, that when a new node joins a ring, the new node may not be load balanced with respect to the existing nodes. As result, the application 20 may be configured to distribute a portion of the load carried on the existing nodes to the new node. In accordance with an embodiment, application 20 may utilize a state machine to perform the redistribution of a load to the new node. In particular, the state machine may determine a set of services to be moved to the new node. For example, in a ring comprising nine existing nodes providing one hundred services, the application 20 may choose ten services to distribute to the new node in order to evenly balance the nodes (i.e., each of the nodes would have ten services). Once the ten services have been chosen, the application 20 may start a state machine for the ten services. Specifically, the state machine may issue a query asking the new node whether there is any existing data for the services being distributed and, if so, what is the highest version number associated with the data. Once this information (which may be in the form of metadata) is obtained from the new node, the state machine will communicate with the primary node for the services to determine if the new node has the current version of the data. If the new node does not have the current version, the state machine may then calculate the changes between the version of the data on the new node and the current version of the data on the primary node and send the changes to the new node (it should be understood that the new node would serve as a secondary node in this example). The state machine may also be utilized to determine whether or not an existing primary node for the services is no longer serving in that role (i.e., the node has either been demoted to a secondary or is no longer part of the ring) in which case, the new node may be designated as the primary node for the services. The state machine may then communicate updates to the other (secondary) nodes in the ring to notify them that the new node is now the primary for the services. It should be understood that when the new node is designated as a primary for the services it may also be designated a secondary for other services provided by the ring. It should be appreciated that the embodiments described make it possible to add hundreds of nodes to a cluster without any impact on performance. For example, for a new node to join the ring, it needs to only communicate with a majority of voters. For a new ring to become primary or secondary for a service, it needs to only communicate with the current primary nodes of those services. In order to commit data, the primary node needs to replicate the data only to the chosen secondary nodes. In this manner, the size of a cluster will not slow down or adversely affect any functionality, thus allowing very large clusters of consisting of hundreds or even thousands of nodes to be built.

From operation 230, the routine 200 continues to operation 235, where the application 20 may be utilized to select primary and secondary nodes for the ring formed at operation 205. As discussed above, a primary node may be responsible for providing a particular service or services to a user via a user-sign in operation. It should be understood however, that user-sign in is just an example of services which may be provided by a primary node. In particular, it should be appreciated that the primary node for a particular user may provide all of the services exposed by LYNC servers. These services may include, without limitation, user sign-in, conferencing services, instant messaging services and telephony services. It should further be understood that LYNC SERVER software may also provide additional services which are not explicitly discussed herein. It should further be understood that the secondary nodes are responsible for providing service availability in the event of a failure of the primary node.

From operation 235, the routine 200 continues to operation 240, where the application 20 may be utilized to synchronously replicate data on the primary node to one or more secondary nodes. In particular, the application 20 may be configured to replicate services and data to help provide high availability when one or more nodes fail in the ring. In addition, when an entity (i.e., a user or other application) makes changes to data on the primary node, the data is changed the primary node and replicated to one or more secondary nodes.

From operation 240, the routine 200 continues to operation 245, where the application 20 may be utilized to select a secondary node upon the failure of a primary node in the ring as shown in FIG. 1B. In particular, when a node goes down, the ring may process the event and move the services that are on the failing node to one of the secondary nodes in the ring that are still active.

From operation 245, the routine 200 continues to operation 250, where the application 20 may be utilized to receive a query for any service at any node from: (1) any node in the ring or (2) any node which is not part of the ring. For example, the application 20 may be configured to enable any node in the ring to issue a query so as to determine the primary node for a given service. From operation 250, the routine 200 then ends.

Figure 3:
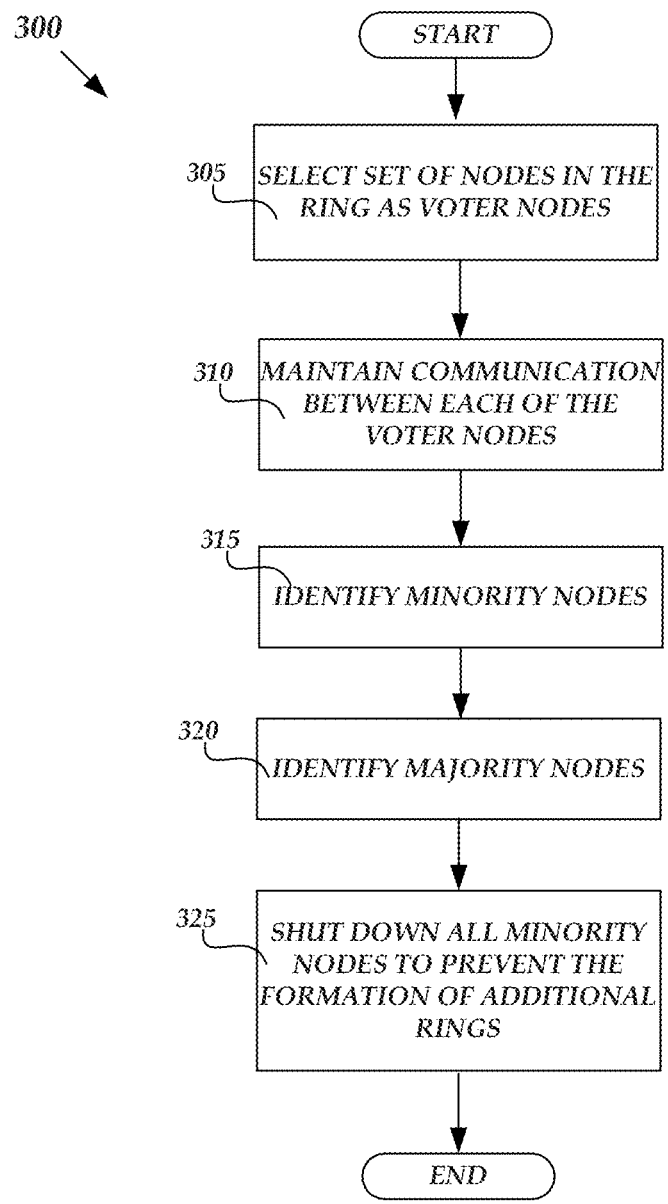
FIG. 3 is a flow diagram illustrating a routine for preventing the formation of additional rings as a result of a network partition, in accordance with an embodiment.

FIG. 3 is a flow diagram illustrating a routine 300 for preventing the formation of additional rings as a result of a network partition, in accordance with an embodiment. The routine 300 begins at operation 305, where the application 20 is utilized to select a set of nodes in a ring as voter nodes.

From operation 305, the routine 300 continues to operation 310, where the application 20 may be utilized to maintain communication between each of the voter nodes in the ring.

From operation 310, the routine 300 continues to operation 315, where the application 20 may be utilized to identify minority nodes resulting from a failure such as a network partition. For example, in response to a network partition (i.e., a communications link failure between two or more nodes), multiple partitions may be created. Nodes in partitions not containing a majority of the voter nodes will be identified as minority nodes.

From operation 315, the routine 300 continues to operation 320, where the application 20 may be utilized to identify majority nodes resulting from a network partition. In particular, in response to a network partition (i.e., a communications link failure between two or more nodes), multiple partitions may be created. Nodes in the partition containing the majority of the voter nodes will be identified as the majority nodes.

From operation 320, the routine 300 continues to operation 325, where the application 20 may be utilized to shut down all of the minority nodes in order to prevent the formation of additional rings. It should be understood that there may be circumstances in which so much partitioning has occurred that no single partition will have a majority of the voters. In these circumstances, all of the partitions would be shut down. From operation 325, the routine 300 then ends.

Figure 4:
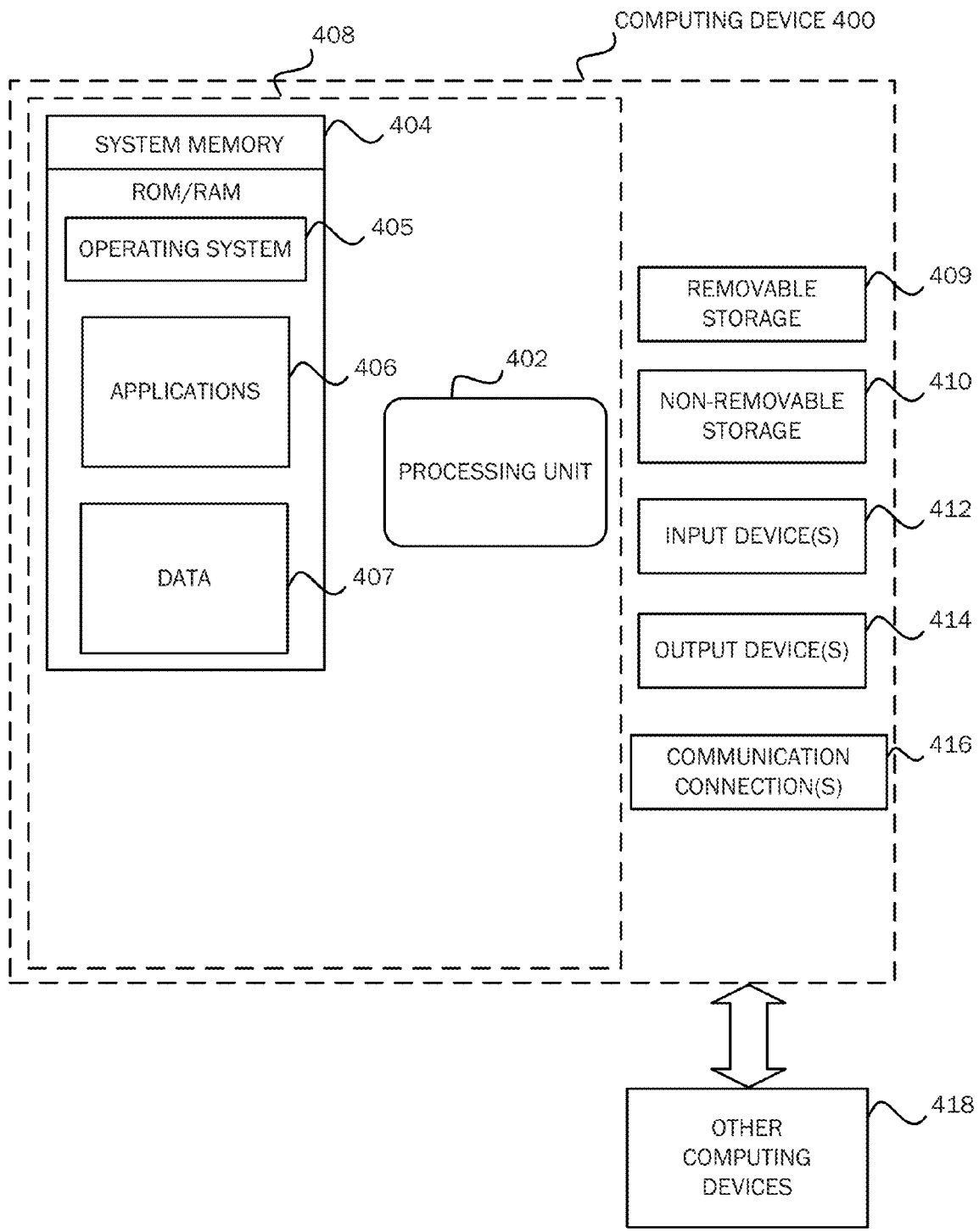
FIG. 4 is a simplified block diagram of a computing device with which various embodiments may be practiced.

FIG. 4 is a block diagram illustrating example physical components of a computing device 400 with which various embodiments may be practiced. The computing device components described below may be suitable for the nodes 40, 50 and 60 described above with respect to FIGS. 1A, 1B and 1C. In a basic configuration, the computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include an operating system 405, applications 406 and data 407. Operating system 405, for example, may be suitable for controlling computing device 400's operation and, in accordance with an embodiment, may comprise the WINDOWS operating systems from MICROSOFT CORPORATION of Redmond, Wash. The applications 406 may comprise the functionality of the application 20 described above with respect to FIGS. 1A, 1B, 1C, 2 and 3, described above. The applications 406 may also include other application programs. It should be understood that the embodiments described herein may also be practiced in conjunction with other operating systems and application programs and further, is not limited to any particular application or system.

The computing device 400 may have additional features or functionality. For example, the computing device 400 may also include additional data storage devices (removable and/or non-removable) such as, for example, magnetic disks, optical disks, solid state storage devices ("SSD"), flash memory or tape. Such additional storage is illustrated in FIG. 4 by a removable storage 409 and a non-removable storage 410.

Generally, consistent with various embodiments, program modules may be provided which include routines, programs, components, data structures, and other types of structures that may perform particular tasks or that may implement particular abstract data types. Moreover, various embodiments may be practiced with other computer system configurations, including hand-held devices, multiprocessor systems, microprocessor-based or programmable consumer electronics, minicomputers, mainframe computers, and the like. Various embodiments may also be practiced in distributed computing environments where tasks are performed by remote processing devices that are linked through a communications network. In a distributed computing environment, program modules may be located in both local and remote memory storage devices.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 400 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Various embodiments, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. The system memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 400. Any such computer storage media may be part of the computing device 400. The computing device 400 may also have input device(s) 412 such as a keyboard, a mouse, a pen, a sound input device (e.g., a microphone), a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

While certain embodiments have been described, other embodiments may exist. Furthermore, although various embodiments have been described as being associated with data stored in memory and other storage mediums, data can also be stored on or read from other types of computer-readable media, such as secondary storage devices (i.e., hard disks, floppy disks, or a CD-ROM), a carrier wave from the Internet, or other forms of RAM or ROM. Further, the disclosed routines' operations may be modified in any manner, including by reordering operations and/or inserting or operations, without departing from the embodiments described herein.

It will be apparent to those skilled in the art that various modifications or variations may be made without departing from the scope or spirit of the embodiments described herein. Other embodiments will be apparent to those skilled in the art from consideration of the specification and practice of the embodiments described herein. Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of providing scalable and highly available clustering for large scale real-time applications, comprising:
    forming, by a computer, a ring comprising a plurality of nodes, a state of each of the plurality of nodes being maintained in the ring;
    detecting, by the computer, a network partition affecting communications between the plurality of nodes;
    preventing, by the computer, the formation of at least one additional ring among the plurality of nodes;
    selecting a set of the plurality of nodes in the ring as voter nodes;
    maintaining communication between each of the voter nodes;
    upon detecting the network partition, identifying minority nodes among the plurality of nodes;
    upon detecting the network partition, identifying majority nodes among the plurality of nodes, the majority nodes being unable to communicate with the minority nodes;
    shutting down all of the minority nodes to prevent the formation of the at least one additional ring; and
    receiving a query to determine a current primary node for a service in the plurality of nodes in the ring, the query being issued from at least one other one of the plurality of nodes in the ring.

2. The method of claim 1, wherein the voter nodes comprise an odd number of nodes within the plurality of nodes in the ring.

3. The method of claim 1, further comprising mapping a set of services to the plurality of nodes in the ring.

4. The method of claim 3, further comprising load balancing the set of services so that the set of services are evenly distributed across the plurality of nodes in the ring.

5. The method of claim 3, further comprising, upon a failure of one of the plurality of nodes in the ring, moving the set of services from the failed node to other available nodes in the ring.

6. The method of claim 3, further comprising, adding at least one new node to the ring while maintaining communications among the plurality of nodes in the ring.

7. The method of claim 3, further comprising:
    selecting a primary node and one or more secondary nodes from among the plurality of nodes for providing the set of services;
    synchronously replicating data on the primary node to the one or more secondary nodes; and
    selecting the one or more secondary nodes upon a failure of the primary node.

8. A system for providing scalable and highly available clustering for large scale real-time applications, comprising:
    a memory for storing executable program code; and
    a processor, functionally coupled to the memory, the processor being responsive to computer-executable instructions contained in the program code and operative to:
    form a ring comprising a plurality of nodes, the plurality of nodes comprising a plurality of servers for providing a set of services to one or more users, a state of each of the plurality of nodes being maintained in the ring;
    detect a network partition affecting communications between the plurality of nodes;
    prevent the formation of at least one additional ring among the plurality of nodes;
    select a set of the plurality of nodes in the ring as voter nodes;
    maintain communication between each of the voter nodes;
    upon detecting the network partition, identifying minority nodes among the plurality of nodes;
    upon detecting the network partition, identifying majority nodes among the plurality of nodes, the majority nodes being unable to communicate with the minority nodes;
    shut down all of the minority nodes to prevent the formation of the at least one additional ring; and
    receive a query to determine a current primary node for a service in the plurality of nodes in the ring, the query being issued from at least one other one of the plurality of nodes in the ring.

9. The system of claim 8, wherein the voter nodes comprise an odd number of nodes within the plurality of nodes in the ring.

10. The system of claim 8, wherein the processor is further operative to map a set of services to the plurality of nodes in the ring.

11. The system of claim 10, wherein the processor is further operative to load balance the set of services so that the set of services are evenly distributed across the plurality of nodes in the ring.

12. The system of claim 10, wherein the processor is further operative to move the set of services from the failed node to other available nodes in the ring, upon a failure of one of the plurality of nodes in the ring.

13. The system of claim 10, wherein the processor is further operative to add at least one new node to the ring while maintaining communications among the plurality of nodes in the ring.

14. The system of claim 10, wherein the processor is further operative to:
 select a primary node and one or more secondary nodes from among the plurality of nodes for providing the set of services;
 synchronously replicate data on the primary node to the one or more secondary nodes; and
 select the one or more secondary nodes upon a failure of the primary node.

15. A computer-readable storage device comprising computer executable instructions which, when executed by a computer, will cause the computer to perform a method of providing scalable and highly available clustering for large scale real-time applications, comprising:
 forming, by a computer, a ring comprising a plurality of nodes, a state of each of the plurality of nodes being maintained in the ring;
 selecting a set of the plurality of nodes in the ring as voter nodes;
 maintaining communication between each of the voter nodes;
 detecting a network partition affecting communications between the plurality of nodes;
 upon detecting the network partition, identifying minority nodes among the plurality of nodes;
 upon detecting the network partition, identifying majority nodes among the plurality of nodes, the majority nodes being unable to communicate with the minority nodes;
 shutting down all of the minority nodes to prevent the formation of the at least one additional ring; and
 receiving a query to determine a current primary node for a service in the plurality of nodes in the ring, the query being issued from at least one other one of the plurality of nodes in the ring.

16. The computer-readable storage device of claim 15, further comprising:
 mapping a set of services to the plurality of nodes in the ring;
 load balancing the set of services so that the set of services are evenly distributed across the plurality of nodes in the ring;
 upon a failure of one of the plurality of nodes in the ring, moving the set of services from the failed node to other available nodes in the ring;
 adding at least one new node to the ring while maintaining communications among the plurality of nodes in the ring;
 selecting a primary node and one or more secondary nodes from among the plurality of nodes for providing the set of services;
 synchronously replicating data on the primary node to the one or more secondary nodes; and
 selecting the one or more secondary nodes upon a failure of the primary node.

\* \* \* \* \*